US010707761B1

(12) United States Patent
Couleur et al.

(10) Patent No.: US 10,707,761 B1
(45) Date of Patent: Jul. 7, 2020

(54) POWER CONVERTER WITH ON-RESISTANCE COMPENSATION

(71) Applicant: Apple Inc., Cupertino, CA (US)

(72) Inventors: Michael Couleur, Rottach Egern (DE); Andrea Acquas, München (DE); Nicola Rasera, Unterschleissheim (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/394,823

(22) Filed: Apr. 25, 2019

(51) Int. Cl.
*H02M 3/158* (2006.01)
*G06F 1/26* (2006.01)
*H02M 3/156* (2006.01)
*H02M 3/157* (2006.01)

(52) U.S. Cl.
CPC .......... *H02M 3/1582* (2013.01); *G06F 1/26* (2013.01); *H02M 3/156* (2013.01); *H02M 3/157* (2013.01); *H02M 2003/1566* (2013.01)

(58) Field of Classification Search
CPC .... H02M 3/156; H02M 3/158; H02M 3/1588; H02M 3/155; H02M 3/1582; H02M 3/157; H02M 3/1563; H02M 2003/1566; H02M 2003/1557; H02M 2001/0012; H02M 2001/0009; H02M 2001/385
USPC ................................................ 323/271–285
See application file for complete search history.

(56) References Cited

U.S. PATENT DOCUMENTS

| 7,706,151 | B2 | 4/2010 | Neidorff et al. | |
|---|---|---|---|---|
| 7,764,054 | B1* | 7/2010 | Guo | H02M 3/1584 323/224 |
| 2006/0044174 | A1* | 3/2006 | Bayer | H02M 3/156 341/164 |
| 2007/0120547 | A1* | 5/2007 | Tateishi | H02M 3/158 323/282 |
| 2015/0028830 | A1* | 1/2015 | Chen | H02M 3/158 323/271 |
| 2015/0162833 | A1* | 6/2015 | Phadke | H02M 3/158 323/271 |
| 2018/0367033 | A1 | 12/2018 | Kotikalapoodi | |

* cited by examiner

*Primary Examiner* — Bryan R Perez
(74) *Attorney, Agent, or Firm* — Kowert, Hood, Munyon, Rankin & Goetzel, P.C.

(57) ABSTRACT

A power converter circuit included in a computer system may charge and discharge a switch node coupled to a regulated power supply node via an inductor. During a charge cycle, the power converter circuit may generate a reference ramp signal that has an initial voltage level greater than that of the switch node. The power converter may also generate a sense ramp signal using the voltage level of the switch node, and halt the charge cycle using results of a comparison of the respective voltage levels of the reference ramp signal and the sense ramp signal.

13 Claims, 8 Drawing Sheets

POWER CONVERTER WITH ON-RESISTANCE COMPENSATION

BACKGROUND

Technical Field

Embodiments described herein relate to integrated circuits, and more particularly, to techniques for generating regulated power supply voltages.

Description of the Related Art

Modern computer systems may include multiple circuits blocks designed to perform various functions. For example, such circuit blocks may include processors, processor cores configured to executed execute software or program instructions. Additionally, the circuit blocks may include memory circuits, mixed-signal or analog circuits, and the like.

In some computer systems, the circuit blocks may be designed to operate at different power supply voltage levels. Power management circuits may be included in such computer systems to generate and monitor varying power supply voltage levels for the different circuit blocks.

Power management circuits often include one or more power converter circuits configured to generated regulator voltage levels on respective power supply signals using a voltage level of an input power supply signal. Such regulator circuits may employ multiple passive circuit elements, such as inductors, capacitors, and the like.

SUMMARY OF THE EMBODIMENTS

Various embodiments for generating a regulated power supply voltage level are disclosed. Broadly speaking, a voltage regulator circuit, that includes a switch node coupled to a regulated power supply node via an inductor, may be configured to source current to the switch node during a charge cycle. A control circuit may be configured to initiate the charge cycle in response to a determination that a voltage level of the switch node is less than a reference voltage level. In response to initiating the charge cycle, the control circuit may be further configured to generate a reference ramp signal whose initial voltage level is greater than the voltage level of the switch node and generate a sense ramp signal using the voltage level of the switch node. The control circuit may be further configured to halt the charge cycle using results of a comparison of respective voltage levels of the reference ramp signal and the sense ramp signal. In another embodiment, the control circuit may be further configured to generate the initial voltage level using the voltage level of the switch node. In some embodiments, the control circuit may be further configured to buffer the voltage level of the switch node to generate a buffered signal.

BRIEF DESCRIPTION OF THE DRAWINGS

The following detailed description makes reference to the accompanying drawings, which are now briefly described.

Figure 1:
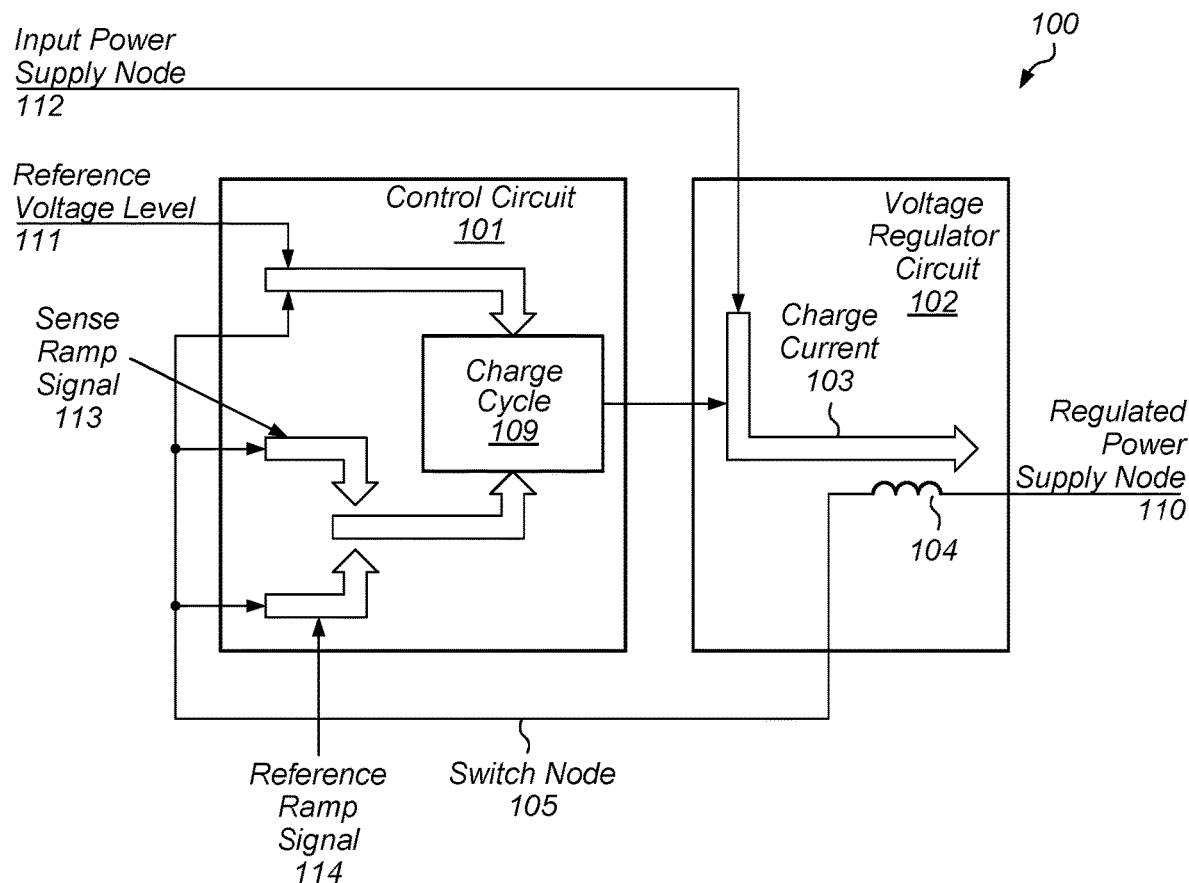
FIG. 1 is a block diagram of an embodiment of a power converter circuit.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

Computer systems may include multiple circuit blocks configured to perform specific functions. Such circuit blocks may be fabricated on a common substrate and may employ different power supply voltage levels. Power management units (commonly referred to as "PMUs") may include multiple power converter circuits configured to generate regulated voltage levels for various power supply signals. Such power converter circuits may employ regulator circuit that include both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. One type of commonly used voltage regulator circuit is a buck converter circuit. Such converter circuits include multiple devices and a switch node that is coupled to a regulated power supply node via an inductor. Particular devices are then activated to periodically charge and discharge the switch node in order to maintain a desired voltage level on power supply node.

To determine the duration of either the charge cycle or discharge cycle, a feedback loop may be employed. Such feedback loops compare ramp signals whose characteristics are based on operating parameters of the power converter circuit, and based on results of the comparison, halt either the charge or discharge cycle. In some cases, current begin sourced to the load through the inductor is measured during a charge cycle (referred to as "peak control"), while in other cases, the current being sunk from the load through the inductor is measured during a discharge cycle (referred to as "valley control").

In some cases, power converter circuits may provide large currents to a load circuit in order to maintain a desired voltage level on the regulated power supply node. If the current provided to the load is sufficiently large, a voltage drop across switch devices in the power converter circuit that are coupled to the inductor may present difficulties with operation of the feedback loop.

As noted above, some power converter circuits use generated ramp signals that mimic electrical characteristics (e.g., current flowing through the inductor) of the power converter circuits. As the voltage drop across the switch devices increases, the behavior of the generated ramp signals deviate from the behavior of the electrical characteristics they are mimicking. Such deviation from their intended behavior can result in an increase in locking time of the feedback loop, instability in the feedback loop, and loss of dynamic range within the feedback loop.

The embodiments illustrated in the drawings and described below may provide techniques for operating a power converter circuit, which includes increasing an initial voltage level of a reference ramp signal (referred to herein as "compensating the reference ramp signal"), thereby improving the dynamic range of feedback circuits included in the power converter circuit and reducing lock time of the feedback loop of the power converter circuit.

A block diagram depicting an embodiment of a power converter circuit is illustrated in FIG. 1. As illustrated, power converter circuit 100 includes control circuit 101 and voltage regulator circuit 102.

Voltage regulator circuit 102 includes switch node 105 coupled to regulated power supply node 110 via inductor 104. In various embodiments, voltage regulator circuit 102 is configured, in response to an initiation of charge cycle 109, to charge switch node 105 using input power supply node 112. It is noted that although a single voltage regulator circuit is depicted in the embodiment of FIG. 1, in other embodiments, multiple voltage regulator circuits with corresponding sense circuits (collectively "phase units" or "phase circuits") may be coupled to regulated power supply node 110 and operated with different timings (or "phases").

Control circuit 101 is configured to initiate charge cycle 109 in response to a determination that a voltage level of switch node 105 is less than reference voltage level 111. Control circuit 101 is further configured, in response to initiating charge cycle 109, to generate reference ramp signal 114 whose initial voltage level is greater than the voltage level of switch node 105, and generate sense ramp signal 113 using the voltage level of switch node 105. By generating reference ramp signal 114 using an initial voltage level greater than the voltage level of switch node 105, the dynamic range of the feedback loop may be increased, thereby improving the locking time of the feedback loop.

As noted above, generated ramp signal, such as reference ramp signal 114 and sense ramp signal 113, may be used to determine the duration of charge or discharge cycles in a power converter circuit. As illustrated, control circuit 101 is also configured to halt charge cycle using results of a comparison of respective voltage levels of reference ramp signal 114 and sense ramp signal 113.

As described below in more detail, control circuit 101 may include voltage generator circuits and ramp generator circuits. Additionally, control circuit 101 may include comparator circuits, as well as state machines or other sequential logic circuits.

Figure 2:
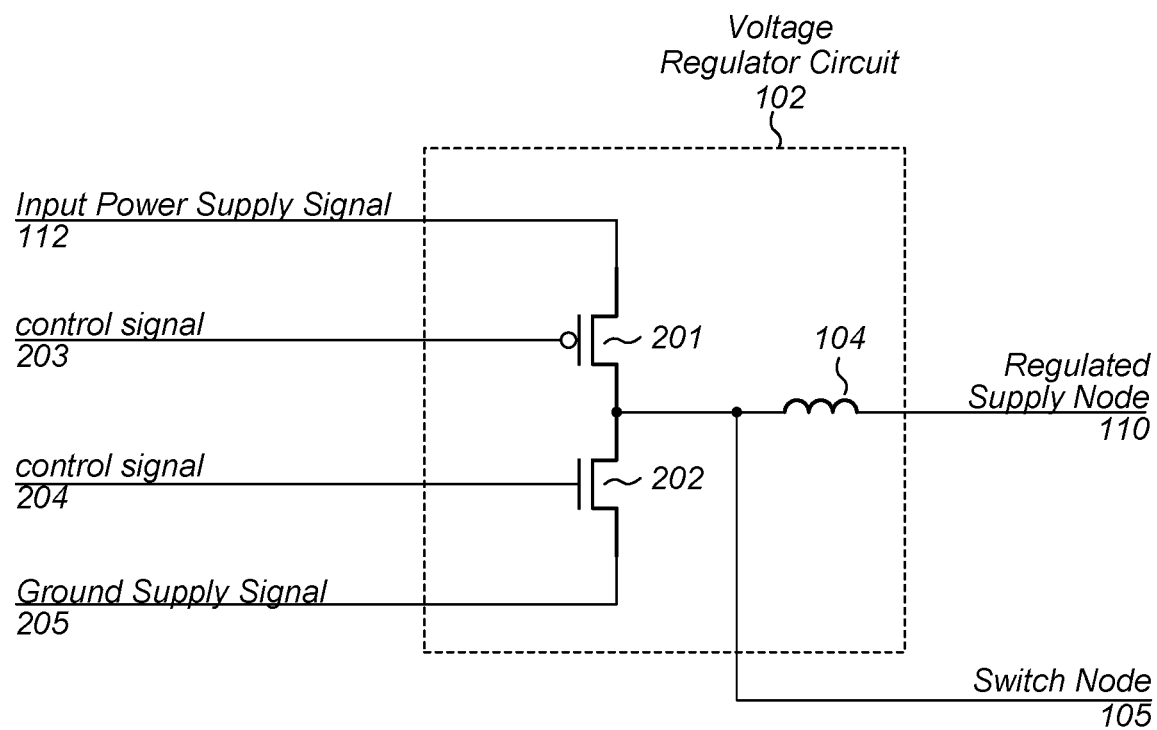
FIG. 2 is a block diagram of an embodiment of a voltage regulator circuit.

A schematic diagram of voltage regulator circuit 102 is depicted in FIG. 2. As illustrated, voltage regulator circuit 102 includes devices 201 and 202, which are both coupled to switch node 105, and controlled by control signals 203 and 204, respectively.

In various embodiments, control circuit 101 may generate control signals 203 and 204. Each of control signals 203 and 204 is used to activate a corresponding one of devices 201 and 202 during charge and discharge cycles. During a charge cycle, current is sourced from input power supply node 112 to regulated power supply node 110, and during a discharge cycle, current is sunk from regulated power supply node 110 into ground supply node 205. Alternating between charge and discharge cycles, and adjusting the duration of either of the charge or discharge cycles may maintain a desired voltage level maintained on regulated power supply node 110.

Device 201 is coupled between input power supply node 112 and switch node 105, and is controlled by control signal 203. During a charge cycle, control signal 203 is asserted, which activates device 201 and couples input power supply node 112 to switch node 105, thereby charging switch node 105 by allowing a current to flow from input power supply node 112 to switch node 105, and then onto regulated power supply node 110. As used herein, asserting, or an assertion of, a signal refers to setting the signal to a particular voltage level that activates a circuit or device coupled to the signal. The particular voltage level may be any suitable value. For example, in the case where device 201 is p-channel MOSFET, control signal 203 may be set to a voltage at or near ground potential.

Device 202 is coupled between switch node 105 and ground supply node 205, and is controlled by control signal 204. During a discharge cycle, control signal 204 is asserted, which activates device 202 and couples switch node 105 to ground supply node 205, thereby providing a conduction path from regulated power supply node 110 through inductor 104 into ground supply node 205. While device 202 is active, current flows from regulated power supply node 110 into ground supply node 205, decreasing the voltage level of regulated power supply node 110. As described below in more detail, the duration of the charge cycle may be based on a comparison of respective voltage levels of reference ramp signal 114 and sense ramp signal 113.

Device 201 and device 202 may be particular embodiments of MOSFETs. In particular, device 201 may be a particular embodiment of a p-channel MOSFET and device 202 may be a particular embodiment of an n-channel MOSFET. Although only two devices are depicted in the embodiment of FIG. 2, in other embodiments, any suitable number of devices, coupled in series or parallel, may be employed to achieve particular electrical characteristics (e.g., on-resistance of the devices).

Figure 3:
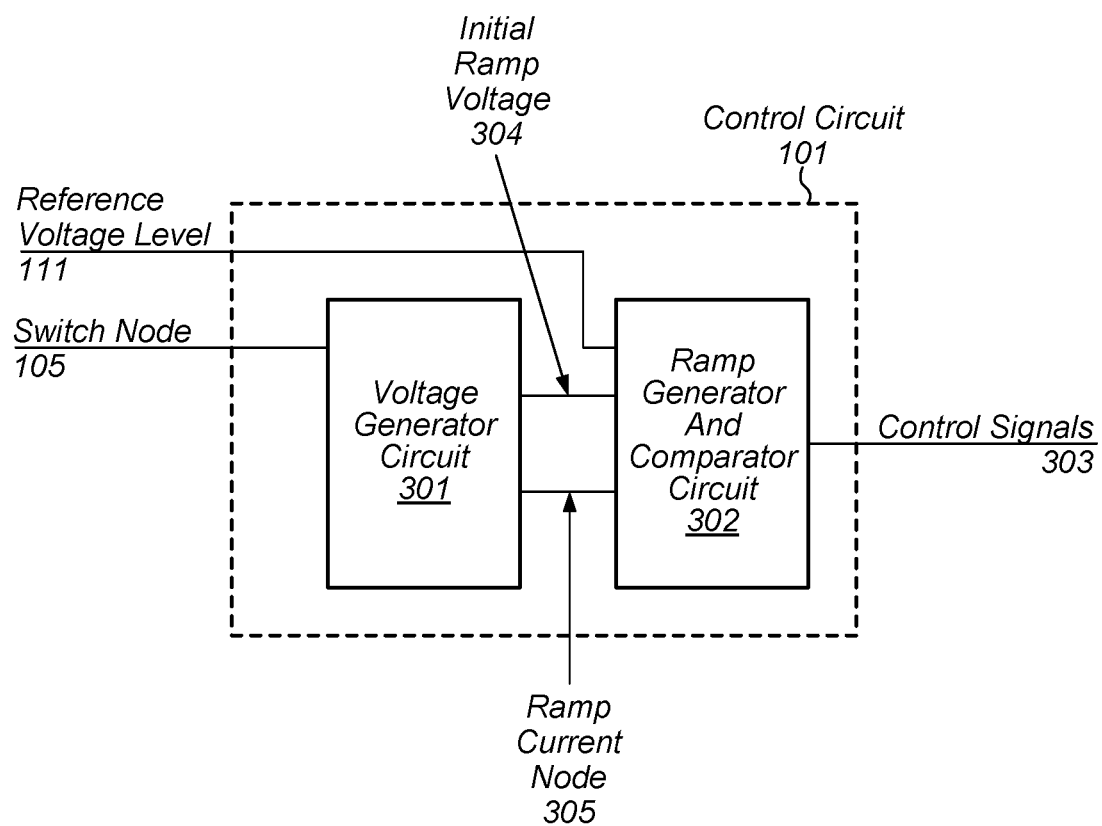
FIG. 3 is a block diagram of a control circuit using in a power converter circuit.

A block diagram of an embodiment of control circuit 101 is illustrated in FIG. 3. As illustrated, control circuit 101 includes voltage generator circuit 301 and ramp generator and comparator circuit 302.

As described below in more detail, voltage generator circuit 301 is configured to use a voltage level of switch node 105 to generate initial ramp voltage 304. In various embodiments, initial ramp voltage 304 corresponds to initial voltage level of reference ramp signal 114 as described above in regard to FIG. 1. Additionally, voltage generator circuit 301 is configured to a ramp current (not shown), whose value is based, at least in part, on the voltage level of switch node 105. In various embodiments, the ramp current is sunk from ramp current node 305.

Ramp and generator and comparator circuit 302 is configured to generate control signals 303. In various embodiments, control signals 303 may include control signals 203 and 204 as depicted in FIG. 2. As described below in more detail, ramp generator and comparator circuit 302 may be configured to generate reference ramp signal 114 and sense ramp signal 113.

It is noted that although control circuit 101 is depicted as including two circuit blocks, in other embodiments, additional circuit blocks, both analog and digital may be included. For example, in some cases, control circuit 101 may include reference generator and biasing circuits, current mirror circuits, as well as combinatorial and sequential logic circuits.

Figure 4:
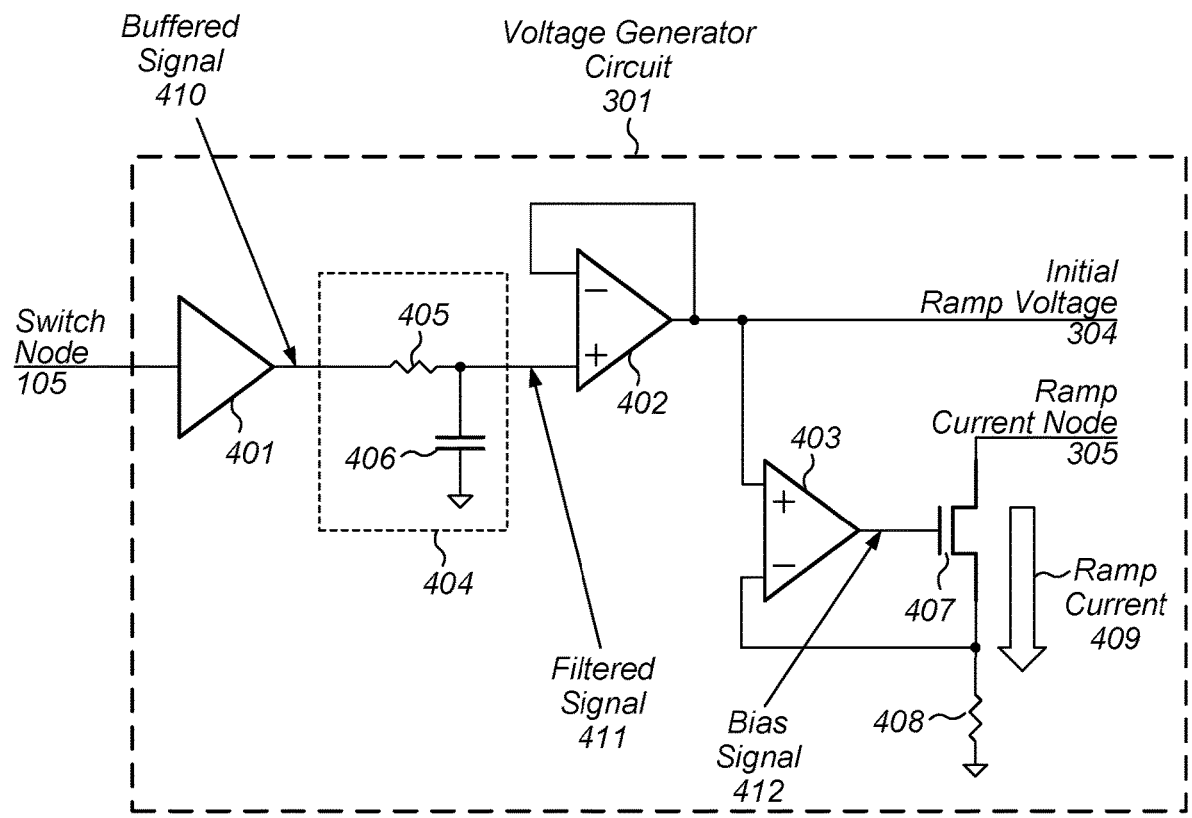
FIG. 4 is a block diagram of an embodiment of a voltage generator circuit.

A block diagram of an embodiment of voltage generator circuit 301 is depicted in FIG. 4. As illustrated, voltage generator circuit 301 includes buffer circuit 401, filter circuit 404, amplifier circuits 402 and 403, device 407, and resistor 408.

Buffer circuit 401 is configured to buffer the voltage level of switch node 105 to generate buffer signal 410. In various embodiments, buffer circuit 401 may be a particular embodiment of a unity-gain amplifier circuit. As used herein, a unity-gain amplifier circuit is an amplifier circuit with a gain value of one. Such amplifier circuits produce an output signal of equivalent magnitude to an input signal. In some cases, the output signal may lag in phase relative to the input signal.

Filter circuit 404 is configured to filter buffered signal 410 to generate filtered signal 411, by attenuating frequency components of buffered signal 410 above a desired cutoff frequency. By attenuating undesirable frequency components, noise from other circuits, power supply signals, and the like, may be reduced, thereby improving stability of power converter circuit 100. For example, the cutoff frequency may be selected as a multiple of the switching frequency of devices 201 and 202 as illustrated in FIG. 2. It is noted that the average voltage level of filtered signal 411 is substantially the same as the voltage level of regulated power supply node 110 added to the product of the on resistance of device 201 and charge current 103.

Although filter circuit 404 is depicted as including passive elements, e.g., resistor 405 and capacitor 406, in other embodiments, filter circuit 404 may include any suitable combination of both passive and active circuit elements. As illustrated, filter circuit 404 includes resistor 405 and capacitor 406. In various embodiments, component values for resistor 405 and capacitor 406 are selected to provide the desired cutoff frequency. Resistor 405 may be constructed using metal, polysilicon, or any other suitable material available on a semiconductor manufacturing process. Capacitor 406 may be constructed using a metal-oxide-metal or other suitable structure available on a semiconductor manufacturing process.

Amplifier circuit 402 is configured to generate initial ramp voltage 304 using filtered signal 411. In various embodiments, amplifier circuit 402 is a particular embodiment of a differential amplifier, such as an operational amplifier (commonly referred to as an "op amp") arranged with its output coupled to its inverting input. By connecting the output to the non-inverting input, initial ramp voltage 304 will closely track changes in filter signal 411. It is noted that in various embodiments, a gain value of amplifier circuit 402 may be unity and the amplifier circuit 402 may be buffering filtered signal 411 to provide sufficient drive for load circuits coupled to initial ramp voltage 304.

Amplifier circuit 403 is configured to generate bias signal 412 using initial ramp voltage 304. Like amplifier circuit 402, amplifier circuit 403 may also be a particular embodiment of a differential amplifier. The inverting input of amplifier circuit 403 is, however, not coupled to the output of amplifier circuit 403, but to a circuit node between device 407 and resistor 408. A gain value associated with amplifier circuit 403 may be selected based, at least in part, on the characteristics of device 407.

Device 407, resistor 408, along with amplifier circuit 403, form a voltage-to-current conversion circuit, that generates ramp current 409 using initial ramp voltage 304. Device 407, which may be a particular embodiment of an n-channel metal-oxide semiconductor field-effect transistor (MOSFET) or other suitable transconductance device, is coupled between ramp current node 305 and resistor 408, and is controlled by bias signal 412. Based on a voltage level of bias signal 412, device 407 will conduct a particular value of ramp current 409 from ramp current node 305.

Resistors 408 is coupled to device 407 and the inverting input of amplifier circuit 403, and a ground signal node. In various embodiments, resistor 408 may be may be constructed using metal, polysilicon, or any other suitable material available on a semiconductor manufacturing process. A value for resistor 408 may be selected based on a desired value of ramp current 409 and an operating point of amplifier circuit 403.

Figure 5:
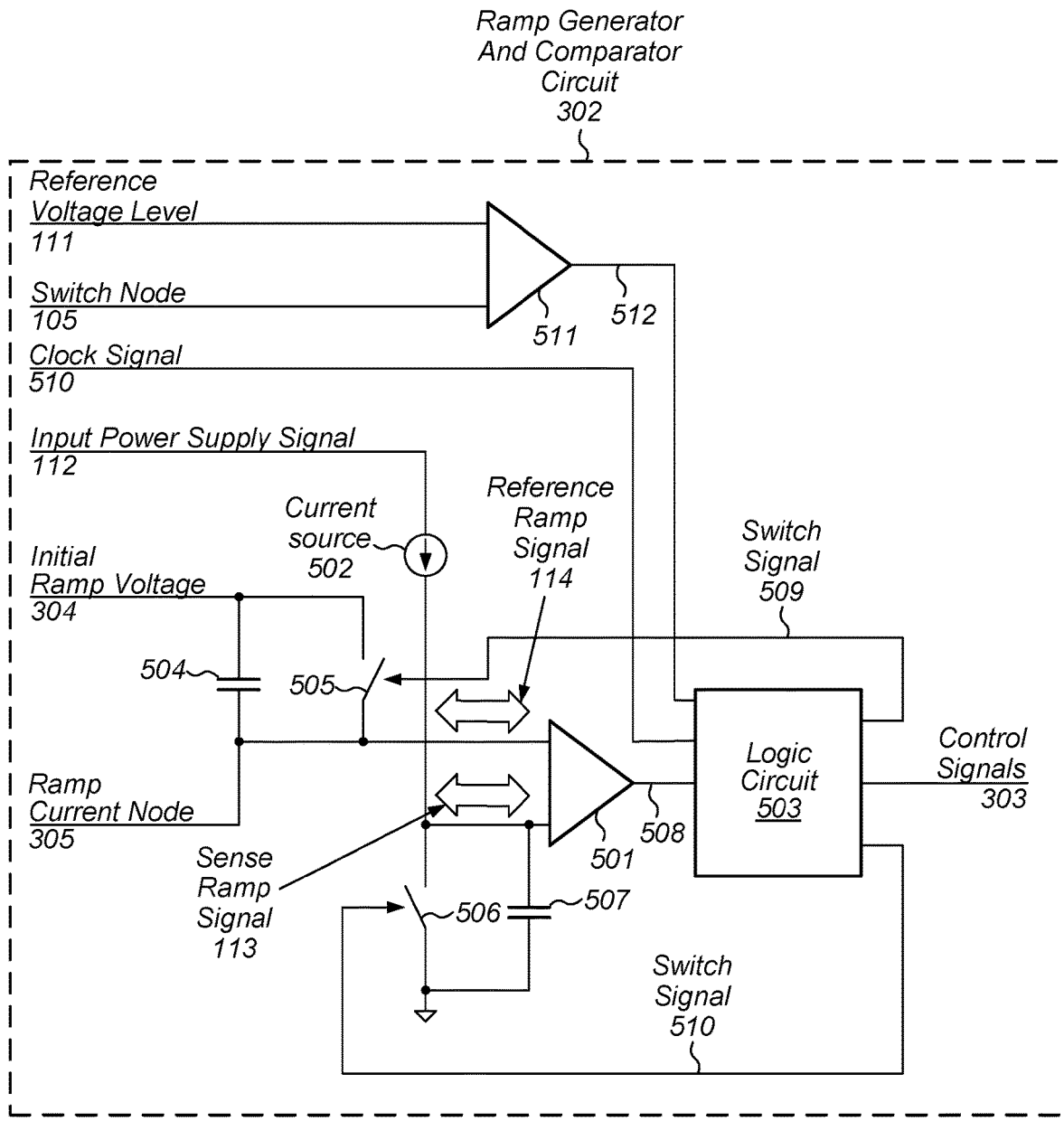
FIG. 5 is a block diagram of an embodiment of a reference ramp generator circuit.

An embodiment of ramp generator and comparator circuit 302 is depicted in FIG. 5. As illustrated, ramp generator and comparator circuit 302 includes comparator circuit 501, current source 502, logic circuit 503, switches 505 and 506, capacitors 504 and 507, and comparator 511.

Comparator circuit 511 may be a particular embodiment of a differential amplifier configured to generate a voltage level on signal 512 proportional to the difference between reference voltage level 111 and a voltage level of switch node 105. Signal 512 may be used by logic circuit 503 to initiate charge cycle 109 by changing the voltage levels of one or more of control signals 303.

Comparator 501 may also be a particular embodiment of a differential amplifier configured to amplifier a difference between a voltage level reference ramp signal 114 and a voltage level of sense ramp signal 113. In various embodiments, a voltage level of signal 508 may be proportional to a difference between the voltage level of reference ramp signal 114 and the voltage level of sense ramp signal 113. Signal 508 may be used by logic circuit 503 to halt charge cycle 109 by further changing the voltage levels of one or more of control signals 303.

Logic circuit 503 may be a particular embodiment of a state machine or sequential logic circuit that is configured to generate control signals 303 as well as switch signals 509 and 510. Prior to the start of charge cycle 109 (e.g., during a discharge cycle), switch signal 510 may be asserted such that switch 506 is closed, shorting one input of comparator circuit 501 to ground. During this same period of time, switch signal 509 may be asserted such that switch 505 is closed and the other input of comparator circuit 501 is coupled to initial ramp voltage 304.

In response to detecting that the voltage level of switch node 105 is less than reference voltage level 111, logic circuit 503 changes the voltage level of at least one of control signals 303 to initiate a charge cycle, as well as de-asserting switch signals 509 and 510. By de-asserting switch signals 509 and 510, switches 505 and 506 both open.

When switch 505 opens, capacitor 504, which has been previously charge to initial ramp voltage 304, begins to discharges as ramp current 409 is sunk from ramp current node 305. As capacitor 504 is discharged, reference ramp signal 114 is generated. When switch 506 opens, capacitor 507 begins to charge from current source 502 to generated sense ramp signal 113. As described above, the voltage levels of the reference ramp signal 114 and sense ramp signal 113 are used by comparator circuit 501 and logic circuit 503 to determine when to halt charge cycle 109. Once charge cycle 109 is halted, logic circuit 503 returns switch signals 509 and 510 to their asserted state to close switches 505 and 506, in order to prepare ramp generator and comparator circuit 302 for another cycle.

Capacitors 504 and 507 may each be constructed using a metal-oxide-metal or other suitable structure available on a semiconductor manufacturing process. Switches 505 and 506 may, in various embodiments, be particular embodiments of either p-channel or n-channel MOSFETs, or any suitable combination thereof.

Current source 502 may be a particular embodiment of a portion of a current mirror implemented using a p-channel MOSFET that is biased to generate a current proportion to a difference between the voltage level of input power supply node 112 and the voltage level of regulated power supply node 110. In other embodiments, ramp generator and comparator circuit 302 may include voltage reference generator circuits, bias circuit, and current mirror circuits used to implement current source 502.

Structures such as those shown in FIGS. 2-5 for generating a regulated power supply signal may be referred to using functional language. In some embodiments, these structures may be described as including "a means for initiating the charge cycle of the switch node in response to a determination that a voltage level of the switch node is less than a reference voltage level," "a means for, in response to initiating the charge cycle, generating a reference ramp signal whose initial voltage level is greater than the voltage level of the switch node," "a means for generating a sense ramp signal using the voltage level of the switch node," and "a means for halting the charge cycle using results of a comparison of respective voltage levels of the reference ramp signal and the sense ramp signal."

The corresponding structure for "means for initiating the charge cycle of the switch node in response to a determination that a voltage level of the switch node is less than a reference voltage level" is comparator 511 and logic circuit 503 as well as equivalents of these circuits. The corresponding structure for "means for, in response to initiating the charge cycle, generating a reference ramp signal whose initial voltage level is greater than the voltage level of the switch node" is voltage generator circuit 301, capacitor 504, and switch 505, and their equivalents. Current source 502, capacitor 507, and switch 506, and their equivalents are the corresponding structure for "means for generating a sense ramp signal using the voltage level of the switch node." The corresponding structure for "means for halting the charge cycle using results of a comparison of respective voltage levels of the reference ramp signal and the sense ramp signal" is comparator 501 and logic circuit 503, and their equivalents.

Figure 6A:
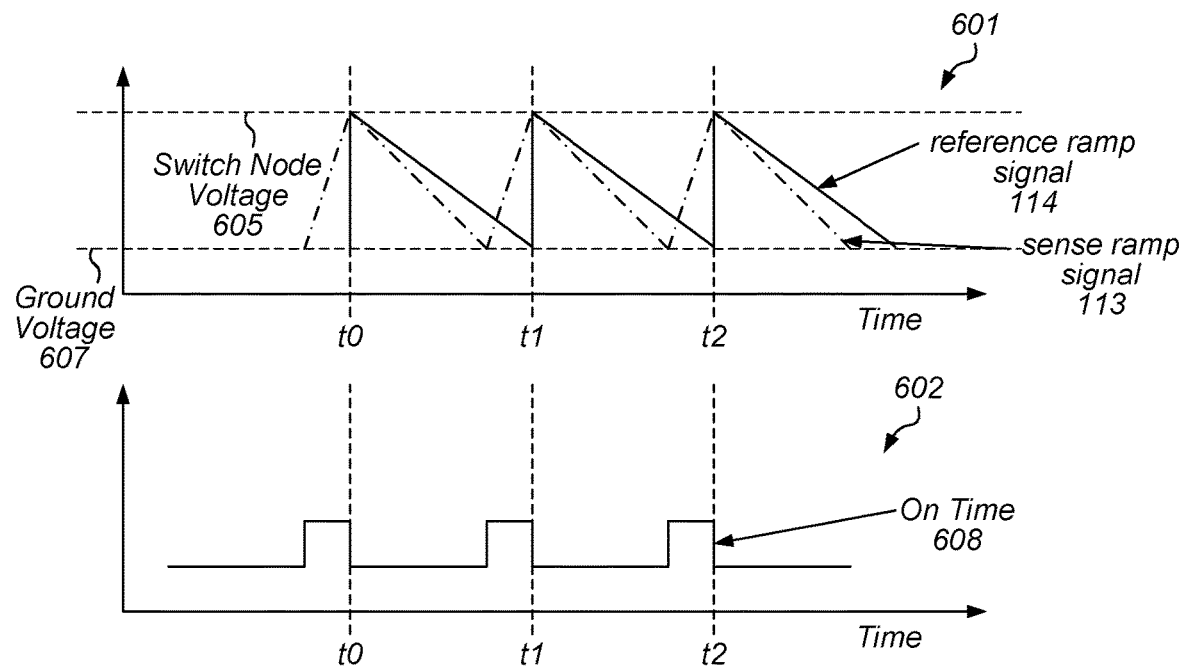
FIG. 6A illustrates sample waveforms associated with the operation of a power converter circuit that does not employ reference ramp compensation.

Turning to FIG. 6A, example waveforms associated with the operation of a power converter circuit that does not employ reference ramp compensation are depicted. As illustrated, graph 601 depicts reference ramp signal 114 and sense ramp signal 113, while graph 602 depicts on time 608. It is noted that on time 608 may be one of control signals 303 or may, in other embodiment, be indicative of any signal included in control circuit 101 that is at a high logic level while voltage regulator circuit 102 sources current to switch node 105.

Prior to time t0, sense ramp signal 113 is at ground potential (indicated by ground voltage 607) and, since no reference ramp compensation is being employed, reference ramp signal is at switch node voltage 605. Due to high load conditions where current demand is high, the power converter circuit attempts to increase the duration of the charge cycle in order for the power converter circuit to stay in regulation, resulting in on time 608 starting prior to time t0.

In response to the increase in the duration of the charge cycle, sense ramp signal 113 begins, prior to time t0, to increase in voltage from ground voltage 607. At time t0, both sense ramp signal 113 and reference ramp signal 114 are at switch node voltage 605, causing the power converter circuit to run out of dynamic range. The power converter may then stop the charge cycle as both ramp signals are the same voltage, sending on time 608 low, and preventing proper regulation. The process then repeats at times t1 and t2. It is noted that reference ramp signal 114 transitions from its initial voltage level to ground voltage 607 in one clock period (e.g., the duration from time t0 to time t1, for example). In various embodiments, values for capacitor 504 and ramp current 409 may be selected to achieve the desired transition time for reference ramp signal 114.

Figure 6B:
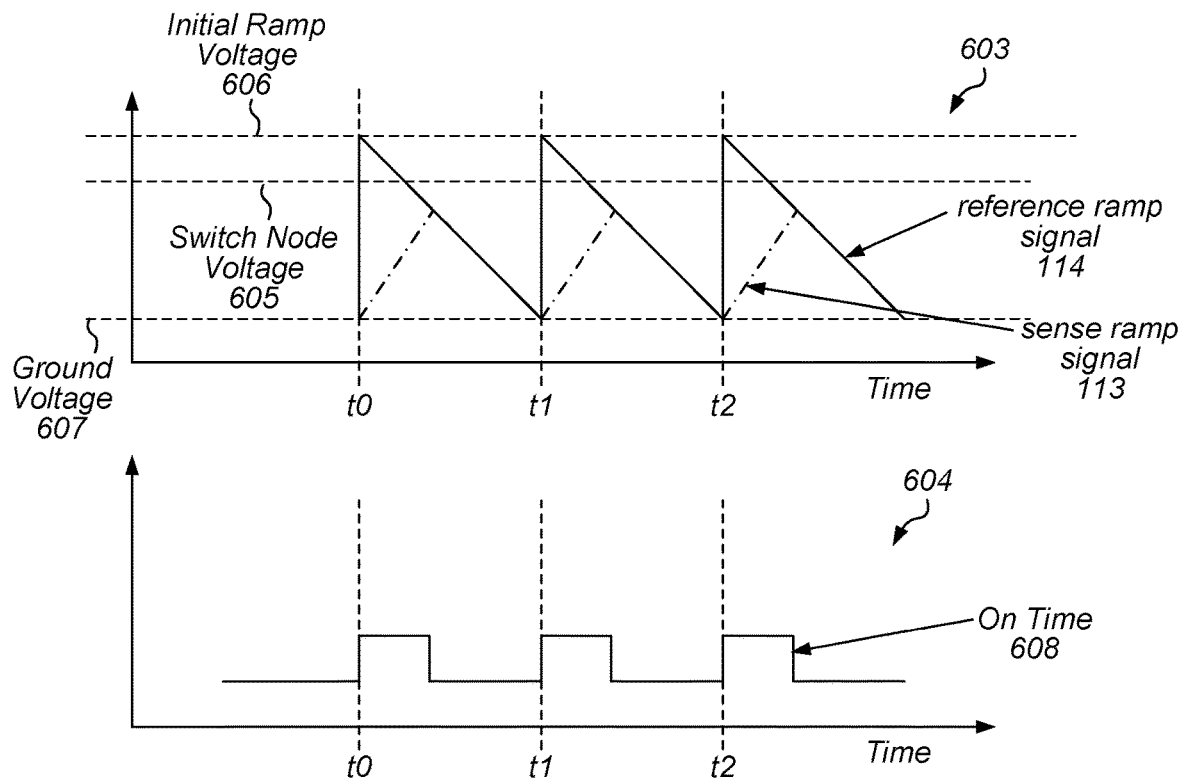
FIG. 6B illustrates sample waveforms associated with the operation of a power converter circuit that employs reference ramp compensation.

Example waveforms associated with the operation of a power converter circuit that employs reference ramp compensation are depicted in FIG. 6B. As illustrated, graph 603 depicts sense ramp signal 113 and reference ramp signal 114, while graph 604 depicts on time 608.

In this case of the waveforms illustrated in FIG. 6B, reference ramp compensation is employed, resulting in reference ramp signal 114 being at initial ramp voltage 606 prior to time t0. Also prior to time t0, sense ramp signal 113 is at or near ground potential (indicated by ground voltage 607). At time t0, regulator circuit 102 begins souring current to switch node 105, on time 608 transitions to a high logic level, sense ramp signal 113 begins to increase in voltage, and reference ramp signal 114 begins to decrease in voltage. As noted above, reference ramp signal 114 will reach ground voltage 607 within a single clock period.

When the voltage levels of sense ramp signal 113 and reference ramp signal 114 are the same, on time 608 transitions to a low logic level and regulator circuit 102 ceases sourcing current to switch node 105. Since reference ramp signal 114 is starting at a higher voltage level, additional dynamic range has been provided, thereby allowing the timing of sense ramp signal 113 to be adjusted without its voltage level immediately reaching that of reference ramp signal 114. This keeps the feedback circuits of the power converter circuit in an operational range, allowing regulation even under high load conditions.

Figure 7:
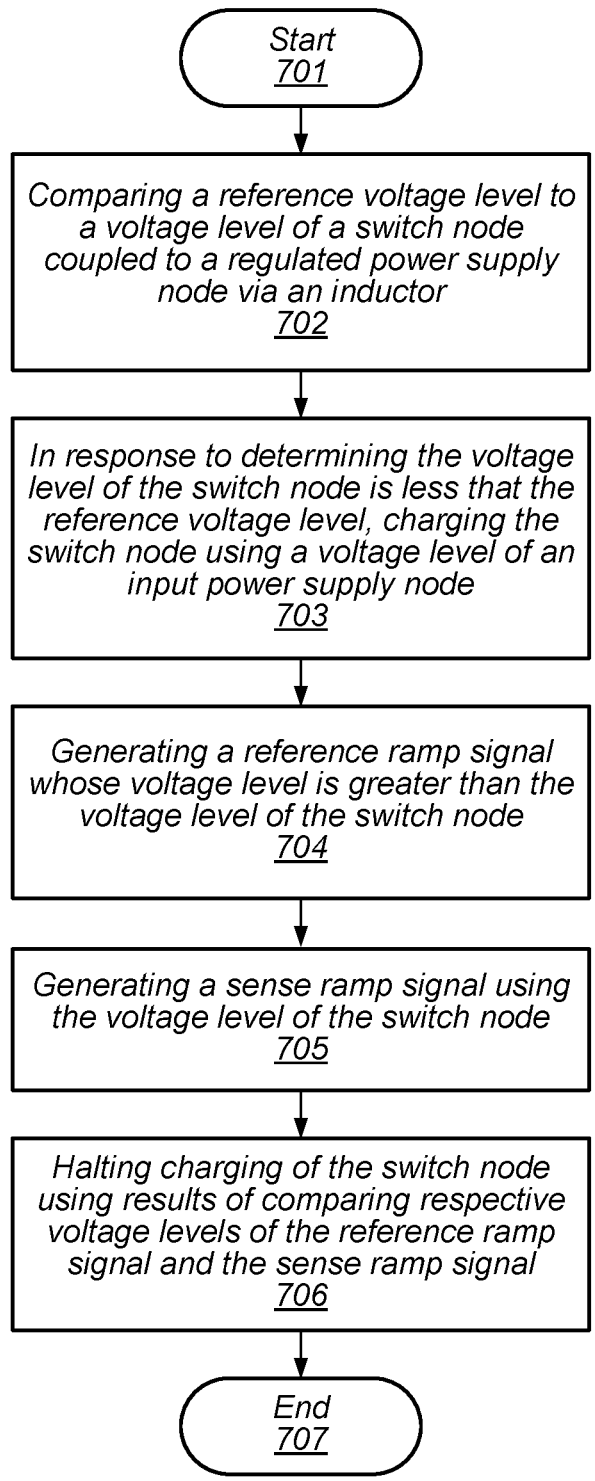
FIG. 7 depicts a flow diagram illustrating an embodiment of a method for operating a power converter circuit.

Turning to FIG. 7, a flow diagram depicting an embodiment of a method for operating a power converter circuit is illustrated. The method, which begins in block 701, may be applied to various power converter circuits, such as power converter circuit 100 as illustrated in FIG. 1.

The method includes comparing a reference voltage level to a voltage level of a switch node coupled to a regulated power supply node via an inductor (block 702). In various embodiments, the method may include amplifying, using a differential amplifier, a difference in the reference voltage level and the voltage level of the switch node. The method may also include setting a latch using an output of the differential amplifier.

The method further includes, in response to determining the voltage level of the switch node is less than the reference voltage level, charging the switch node using a voltage level of an input power supply node (block 703). In various embodiments, the method may include sourcing a current from the input power supply node to the switch node via a transistor or other suitable transconductance device. The method may, in some embodiments, include activating at least one control signal coupled to the transistor.

The method also includes, in response to determining the voltage level of the switch node is less than the reference voltage level, generating a reference ramp signal whose voltage level is greater than the voltage level of the switch node (block 704). In some embodiments, the method may include generating the initial voltage level of the reference ramp signal using the voltage level of the switch node.

The method may, in various embodiments, also include buffering the voltage level of the switch node to generate a buffered signal, and filtering the buffered signal to generate a filtered signal. In some cases, the method may include amplifying the filtered signal to generate the initial voltage level. In some embodiments, generating the reference ramp signal may include charging a capacitor using the initial voltage level and discharging the capacitor using a ramp current whose value is based, at least in part, on the initial voltage level.

The method further includes, in response to determining the voltage level of the switch node is less than the reference voltage level, generating a sense ramp signal using the voltage level of the switch node (block 705). In some embodiments, generating the sense ramp signal may include charging a capacitor using a current source coupled to the input power supply node.

The method also includes halting charging of the switch node using results of comparing respective voltage levels of the reference ramp signal and the sense ramp signal (block 706). The method concludes in block 707.

Figure 8:
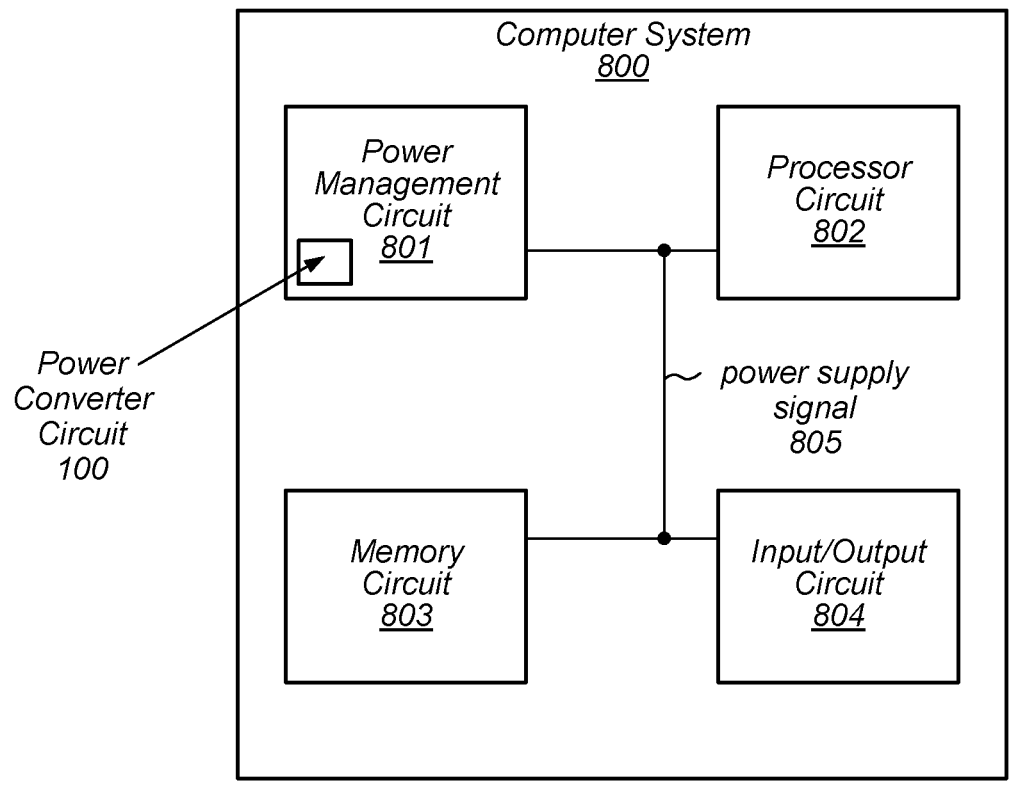
FIG. 8 illustrates a block diagram of a computer system.

A block diagram of computer system is illustrated in FIG. 8. In the illustrated embodiment, the computer system 800 includes power management unit 801, processor circuit 802, memory circuit 803, and input/output circuits 804, each of which is coupled to power supply signal 805. In various embodiments, computer system 800 may be a system-on-a-chip (SoC) and/or be configured for use in a desktop computer, server, or in a mobile computing application such as, e.g., a tablet, laptop computer, or wearable computing device.

Power management unit 801 includes power converter circuit 100 which is configured to generate a regulated voltage level on power supply signal 805 in order to provide power to processor circuit 802, memory circuit 803, and input/output circuits 804. Although power management unit 801 is depicted as including a single power converter circuit, in other embodiments, any suitable number of power converter circuits may be included in power management unit 801, each configured to generate a regulated voltage level on a respective one of multiple internal power supply signals included in computer system 800. In cases where multiple power converter circuits are employed, two or more of the multiple power converter circuits may be connected to a common set of power terminals that connections to power supply signals and ground supply signals of computer system 800.

Processor circuit 802 may, in various embodiments, be representative of a general-purpose processor that performs computational operations. For example, processor circuit 802 may be a central processing unit (CPU) such as a microprocessor, a microcontroller, an application-specific integrated circuit (ASIC), or a field-programmable gate array (FPGA).

Memory circuit 803 may in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that although in a single memory circuit is illustrated in FIG. 8, in other embodiments, any suitable number of memory circuits may be employed.

Input/output circuits 804 may be configured to coordinate data transfer between computer system 800 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 804 may be configured to implement a version of Universal Serial Bus (USB) protocol or IEEE 1394 (Firewire®) protocol.

Input/output circuits 804 may also be configured to coordinate data transfer between computer system 800 and one or more devices (e.g., other computing systems or integrated circuits) coupled to computer system 800 via a network. In one embodiment, input/output circuits 804 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 804 may be configured to implement multiple discrete network interface ports.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising: a voltage regulator circuit including a switch node coupled to a regulated power supply node via an inductor, wherein the voltage regulator circuit is configured to source current to the switch node during a charge cycle; a control circuit configured to: initiate the charge cycle of the switch node in response to a determination that a voltage level of the switch node is less than a reference voltage level; in response to initiating the charge cycle: amplify a filtered version of the voltage level of the switch node to generate an initial ramp voltage level that is greater than the voltage level of the switch node; generate a reference ramp signal using the initial ramp voltage level;

and generate a sense ramp signal using a voltage level of an input power supply node and a result of a comparison of the voltage level of the switch node and the reference voltage level;

and halt the charge cycle using results of a comparison of respective voltage levels of the reference ramp signal and the sense ramp signal.

2. The apparatus of claim 1, wherein the control circuit is further configured to buffer the voltage level of the switch node to generate a buffered voltage level.

3. The apparatus of claim 2, wherein the control circuit is further configured to filter the buffered voltage level to generate the filtered version of the voltage level of the switch node.

4. The apparatus of claim 1, wherein to generate the reference ramp signal, the control circuit is configured to generate a current using the initial ramp voltage level and discharge a capacitor using the current.

5. A method, comprising: comparing a reference voltage level to a voltage level of a switch node coupled to a regulated power supply node via an inductor; in response to determining that the voltage level of the switch node is less than the reference voltage level: charging the switch node using a voltage level of an input supply node; generating an initial ramp voltage level by amplifying a filtered version of the voltage level of the switch node, wherein the initial ramp voltage level is greater than the voltage level of the switch node; generating a reference ramp signal using the initial ramp voltage level;

and generating a sense ramp signal using a voltage level of an input power supply node and a result of comparing the voltage level of the switch node and the reference voltage level;

and halting charging of the switch node using results of comparing respective voltage levels of the reference ramp signal and the sense ramp signal.

6. The method of claim 5, wherein generating the initial ramp voltage level includes buffering the voltage level of the switch node to generate a buffered signal.

7. The method of claim 6, further comprising filtering the buffered signal to generate the filtered version of the voltage level of the switch node.

8. The method of claim 5, wherein generating the sense ramp signal includes charging a capacitor using a current source coupled to the input supply node.

9. The method of claim 5, wherein generating the reference ramp signal includes:

charging a capacitor using the initial ramp voltage level; and discharging the capacitor using a ramp current whose value is based, at least in part, on the initial ramp voltage level.

10. An apparatus, comprising: a voltage regulator circuit including a switch node coupled to a regulated power supply node via an inductor, wherein the voltage regulator circuit is configured to source current to the switch node during a charge cycle; a buffer circuit configured to buffer a voltage level of the switch node to generate a buffered signal; a filter circuit configured to filter the buffered signal to generate a filtered signal; a voltage generator circuit configured to generate, using the filtered signal, an initial ramp voltage level whose voltage is greater than a voltage level of the switch node; a first amplifier circuit configured to generate a bias signal using the initial ramp voltage level; a device configured to generate a ramp current using the bias signal; and a ramp generator and comparator circuit configured to: in response to an initiation of the charge cycle: generate a reference ramp signal using the initial ramp voltage level;

generate a sense ramp signal using a voltage level of an input power supply node and a result of a comparison of the voltage level of the switch node and a reference voltage level;

and halt the charge cycle using results of a comparison of respective voltage levels of the reference ramp signal and the sense ramp signal.

11. The apparatus of claim 10, wherein the filter circuit includes at least a resistor and a capacitor.

12. The apparatus of claim 10, wherein the voltage generator circuit includes a first amplifier circuit configured to amplify the filtered signal to generate the initial ramp voltage level.

13. The apparatus of claim 10, wherein the ramp generator and comparator circuit includes a capacitor, and wherein the ramp generator and comparator circuit is further configured to:

charge the capacitor to the initial ramp voltage level; and discharge the capacitor using the ramp current in response to the initiation of the charge cycle.

* * * * *